United States Patent Office 3,202,643
Patented Aug. 24, 1965

3,202,643
3,4,5,5,5-PENTAFLUOROPENTADIENE AND A HOMOPOLYMER THEREOF
Eldon E. Frisch, Midland, Mich., and Omar W. Steward, Leicester, England; said Steward assignor to Dow Corning Corporation, Midland, Mich., a corporation of Michigan
No Drawing. Filed July 2, 1962, Ser. No. 207,044
2 Claims. (Cl. 260—92.1)

This invention relates to a new pentafluoropentadiene, namely, 3,4,5,5,5-pentafluoro-1,3-pentadiene, and a polymer thereof.

This compound can be prepared in either of two ways. In the first method ethanol is reacted with perfluoropropene in contact with an organic peroxide catalyst to form the compound of the formula $$CF_3CHFCF_2CHOHCH_3$$

Treatment of this compound in sequence with phosphorus pentoxide and a base (sodium hydroxide, potassium hydroxide, etc.) produces the pentadiene of this invention.

A second method of preparing this compound is by the addition of $CF_3CFHCF_2Br$ to ethylene in the presence of an organic peroxide to give a compound of the formula $$CF_3CFHCF_2CH_2CH_2Br$$

Dehydrobromination and dehydrofluorination with a base gives the pentadiene of this invention.

The instant pentadiene polymerizes readily, such as by ultra-violet radiation to give tough, strong, flexible, high molecular weight polymers having improved solvent resistance. The polymers can be used wherever thermoplastic polymers are employed, i.e., as molded articles, coatings or rubbers. In addition, the residual unsaturation therein allows cross-linking of the plastic if desired.

The following examples are illustrative only and should not be construed as limiting the invention which is properly delineated in the appended claims.

Example 1

In a 1.4 liter stainless steel Aminco autoclave were placed 1-bromo-1,1,2,3,3,3-hexafluoropropane (870 g., 3.6 mols) and t-butylperoxide (35.5 g., 4 percent by weight). The autoclave was heated to 115° C. and ethylene was introduced continuously from a cylinder at a pressure of 180 p.s.i. The reaction was carried out over a period of 24 hours while the temperature was maintained at 115° C., and the autoclave was rocked. A second run was carried out similarly with 1-bromo-1,1,2,3,3,3-hexafluoropropane (880 g., 3.8 mols) and t-butylperoxide (35.2 g.). The contents from the autoclave from both runs were combined, washed with water, and dried over anhydrous calcium sulfate. Fractional distillation gave 5-bromo-1,1,1,2,3,3-hexafluoropentane (330 g., 1.28 mols), B.P. 120° C. (739 ml.) a 17 percent yield.

Potassium hydroxide, 85 percent minimum (64 g., about 1.0 mol) was dissolved in a solution of dimethylcarbitol (180 ml.) and water (40 ml.). On dissolving, two layers resulted. This mixture was added over a period of 15 minutes to 5-bromo-1,1,1,2,3,3-hexafluoropentane (141 g., 0.5 mol) and 4-t-butyl catechol (1 g.). During the addition, the reaction temperature rose to 70° C. After stirring for one-half hour, the reaction mixture was basic. After refluxing for three hours, the reaction mixture was only weakly basic. The material boiling below 100° C. was removed through a Vigreaux column, the distillate was dried over anhydrous calcium sulfate, and 4-t-butyl catechol (1 g.) was added to prevent polymerization of the diene. Fractional distillation gave 3,4,5,5,5-pentafluoro-1,3-pentadiene, $CF_3CF=CFCH=CH_2$ (41 g., 0.26 mol), B.P. 40 to 41° C. (746 ml.) 52 percent yield.

Example 2

The product of Example 1 was irradiated with ultraviolet light for four days at room temperature. A tough, strong, flexible polymer resulted, having a softening point of about 170° C.

Example 3

Absolute ethanol (369 g., 8.0 mols) and t-butylperoxide (11.7 g., 0.08 mol) were placed in a 1.4 liter stainless steel Aminco autoclave. The autoclave was cooled by Dry-Ice and evacuated. Perfluoropropene (300 g., 2.0 mols) was distilled from a cylinder into the autoclave. The autoclave was heated to 125° C. for approximately one hour in a rocking assembly. After cooling to room temperature, no pressure remained in the autoclave. The material boiling below 100° C. was removed through a Todd column. Fractional distillation of the higher boiling material gave 3,3,4,5,5,5-hexafluoro-2-pentanol (255 g., 1.30 mols) B.P. 119 to 121° C. (747 ml.) a 65 percent yield.

Phosphorous pentoxide (146 g., 1.2 mols) was added to 3,3,4,5,5,5-hexafluoro-2-pentanol (196 g., 1.0 mol) in small portions with shaking. Throughout the addition, the flask was cooled in an ice bath. Then the mixture was allowed to warm to room temperature over a period of two hours. The flask was connected to a Vigreaux column and was slowly heated. At approximately 210° C. a liquid started to distill. Heating was continued until distillation ceased (250° C.).

A second run was carried out under identical conditions. The distillates were combined, dissolved in toluene (300 ml), washed with an ice cold brine solution, and dried over anhydrous calcium sulfate. The dry toluene solution was filtered and the filtrate was fractionally distilled through a Todd column. There was obtained 3,3,4,5,5,5-hexafluoro-1-pentene (185 g., 1.04 mols) in a 50 percent yield.

Potassium hydroxide, 85 percent minimum (64 g., 1.0 mol) was dissolved in a solution of dimethylcarbitol (180 ml.) and water (40 ml.). On dissolving, two layers resulted. This mixture was added over a period of five minutes to 3,3,4,5,5,5-hexafluoro-1-pentene (178 g., 1.0 mol) and 4-t-butyl catechol (1 g.). The temperature slowly rose to 58° C. The reaction mixture was then refluxed for four hours (70 to 80° C.). The material boiling below 100° C. was removed through a Vigreaux column. The organic layer of the distillate was dried over anhydrous calcium sulfate containing 4-t-butyl catechol (1 g.). The dried organic material was filtered, and the filtrate was placed in a distillation flask which contained 4-t-butyl catechol (1 g.). Fractional distillation gave 3,4,5,5,5-pentafluoro-1,3-pentadiene (62.7 g., 0.40 mol), B.P. 40 to 41° C. (748 ml.), a 40 percent yield.

That which is claimed is:
1. The composition of matter 3,4,5,5,5-pentafluoro-1,3-pentadiene.
2. A homopolymer of 3,4,5,5,5-pentafluoro-1,3-pentadiene.

References Cited by the Examiner
FOREIGN PATENTS
795,514 5/58 Great Britain.
1,089,973 9/60 Germany.

JOSEPH L. SCHOFER, *Primary Examiner.*
WILLIAM H. SHORT, *Examiner.*